May 13, 1947.  G. M. DEMING  2,420,360
MOTOR GOVERNOR
Filed April 25, 1944
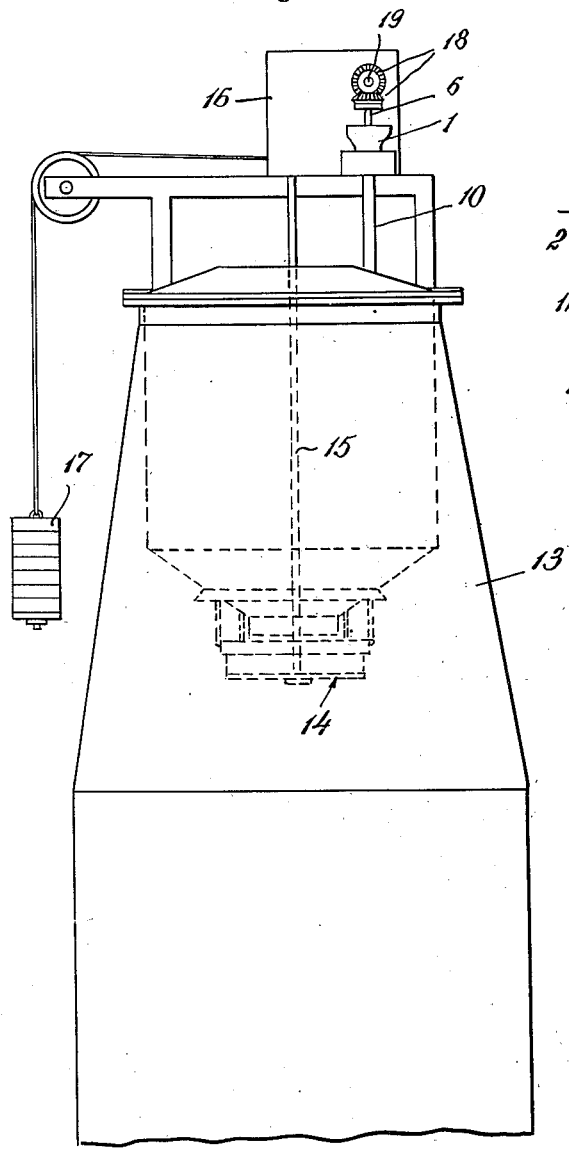
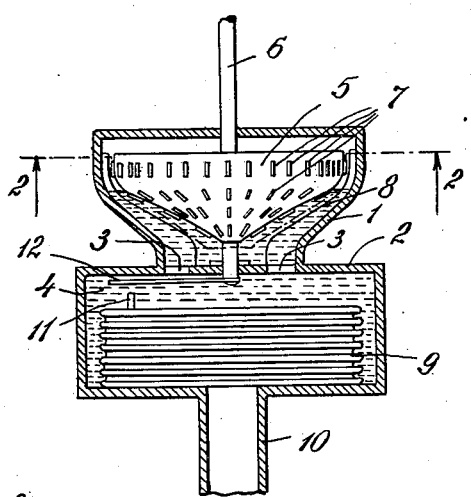
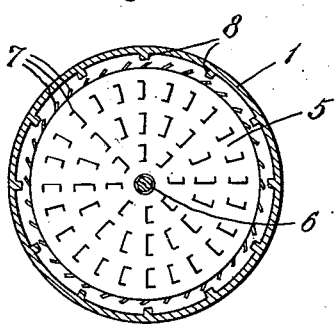
INVENTOR
George M. Deming
BY
ATTORNEYS Patented May 13, 1947

2,420,360

UNITED STATES PATENT OFFICE 2,420,360

MOTOR GOVERNOR

George M. Deming, Orange, N. J., assignor to Air Reduction Company, Incorporated, a corporation of New York Application April 25, 1944, Serial No. 532,693

6 Claims. (Cl. 48—38)

1

This invention relates to liquid governors for motors, such as spring-driven or weight-actuated motors.

More particularly the invention relates to an improved liquid governor for varying the speed of a motor in response to gas pressure conditions, or other conditions, that in turn depend upon the speed of the motor. An example of such a motor is the spring-driven or weight-actuated motor usually employed on an acetylene generator for actuating the carbide feed device. As the pressure in the generator increases beyond a normal, it is desirable to decrease the speed of the carbide feed motor so that the rate of feed of carbide to the generator will be decreased and thereby decrease the gas pressure in the generator until it is restored to normal.

In cases where the maintenance of a given condition at a desired normal depends upon operation of a motor at a certain substantially constant speed, and a change in motor speed brings about a departure of such condition from such normal requiring restoration of the motor speed to bring the condition back to normal, it is often desirable that the control of the motor be such that the return of the condition to normal be very rapid when its departure from normal has been great but that it be less rapid when the departure of the condition from normal is not so great. It is an object of this invention to provide a liquid governor for motors which operates on this principle.

A further object of the invention is to provide an improved liquid governor for motors which is operated in response to gas pressure conditions that in turn depend upon the speed of the motor.

Another object of the invention is to provide a liquid governor which is particularly adapted for use in connection with spring-driven or weight-actuated motors usually employed on acetylene generators for actuating the carbide feed device.

A motor governor embodying the invention is illustrated somewhat diagrammatically in the accompanying drawing, in which:

Figure 1 is a vertical section through the governor;

Fig. 2 is a horizontal section taken on the line 2—2 of Fig. 1; and

Fig. 3 illustrates how the governor may be associated with the carbide feed motor of an acetylene generator.

Referring first to Figs. 1 and 2, the preferred form of the governor comprises a tank or casing 1 having a horizontal partition 2. The space

2 below the partition is in communication with the space above it by means of openings 3 in the partition.

The casing 1 is adapted to contain a liquid 4. A rotor 5 is rotatably mounted on the partition 2 and has a shaft 6 which is adapted to be connected to the motor whose speed is to be controlled. The rotor 5 is provided with a number of fins 7 to increase its resistance to movement in the liquid. Preferably there are also a number of fins 8 in the upper compartment of the casing to prevent the liquid from gradually acquiring the rotary movement of the rotor. The liquid may be water, oil, or the like, and may be thin or viscous depending upon the amount of braking necessary.

In the lower part of the casing 1 there is a bellows 9 the interior of which is adapted to be placed in communication with a source of gas under pressure through a pipe 10. As the gas pressure at such source increases, the bellows 9 expands and causes the level of the liquid in the casing 1 to rise. The greater the rise in the level of the liquid the greater will be the resistance offered to the turning of the rotor 5, and the greater will be the braking action on the motor itself.

Since the liquid governor is not suitable for completely stopping the motor and holding it against rotation, a positive stop is preferably associated with the governor for this purpose and becomes effective if the pressure in the bellows exceeds a predetermined limit. Such a positive stop may comprise a pin 11 on the upper end of the bellows and a crank arm 12 on the lower end of the rotor shaft. As the pressure in the bellows 9 rises, the pin 11 eventually comes into the path of rotation of the crank arm 12 and positively stops movement of the rotor.

The form of governor shown in Figs. 1 and 2 is adapted for use where the operation of the motor that is controlled by the governor is responsible for the existence of the gas pressure in the bellows 9, and where an increase in the speed of the motor results in an increase in gas pressure in the bellows. This causes expansion of the bellows as above described to raise the level of the liquid in the casing and increase the braking action on the motor to thereby reduce its speed until the gas pressure is restored to the desired normal.

One such use of the governor is in connection with the carbide feed motor of an acetylene generator as above stated, and Fig. 3 shows more or less diagrammatically one way in which the governor may be associated with such a motor. The acetylene generator is represented at 13. The carbide feed mechanism 14 is operated by a feeding shaft 15 to drop particles of carbide into water in the lower part of the generator. The shaft 15 is rotated by a motor within the housing 16 supported on top of the generator. The motor is operated by a weight 17. This mechanism for feeding carbide to the generator is well understood in the art and requires no further description. It is shown, for instance, in my prior Patent No. 2,085,084, issued June 29, 1937. As shown in Fig. 3 the casing 1 of the liquid governor may be positioned adjacent the housing 16 of the weight-actuated motor, and its shaft 6 may be connected through bevel gears 18 to some shaft, such as the governor shaft, of the weight-actuated motor. This shaft is represented at 19. The above-described pipe 10 of the liquid governor is placed in communication with the interior of the generator so that the bellows 9 is actuated by the rise and fall in pressure of the acetylene gas generated in the generator. If the pressure of the gas in the generator rises above a desired level by reason of the feed of carbide to the generator at too fast a rate, then the governor will function to slow down the weight-actuated motor so that the carbide will then be fed at a slower rate until the gas pressure is restored to the desired level. It is desirable that the return of the gas pressure to the desired level be very rapid when the departure from such level has been great, and shall be less rapid when the departure is not so great. Also it is desirable that the gradation to less rapid return of the gas pressure to the desired level shall vary through such wide limits that when the pressure is almost to the ideal level, the speed of return to the desired level is but a small fraction of the speed of return for large departures. A return of the pressure to the desired level which approximates an exponential function of the departure is desirable. Thus a better control of the pressure level of the generator is possible thereby minimizing line pressure disturbances and resulting flame fluctuations of gas torches and similar appliances fed from the generator. The rotor 5 in its preferred form is adapted to produce these results, either by giving the rotor the shape shown in Fig. 1, or a similar shape, or by properly arranging the fins on the rotor, or both, or in some other suitable way. It will be seen that under these circumstances the amount of increase in braking effect of the rotor on the motor per given increment of increase in submergence of the rotor in the liquid becomes progressively greater as the submergence of the rotor increases. In other words, the increase in braking action produced by the rotor as its submergence increases is not a straight line function of the rise in the level of the liquid, and therefore there is a relatively small increase in the braking effect of the rotor when the liquid rises a given amount around the lower portion of the rotor but a relatively large increase when the liquid level rises the same amount around a higher portion of the rotor.

If the braking device for the carbide feed motor of an acetylene generator operates on the "on and off" principle as is frequently the case, so-called "after generation" in the generator becomes a problem. Because such after generation on heavy loads involves serious wastage of gas it has not been feasible to use operating pressures which are closer than 1½ or 2 lbs. below the maximum prescribed limit of 15 lbs. per square inch for the generator. The liquid governor herein described when used on an acetylene generator minimizes the objectionable after generation.

While the governor is especially adapted for use in connection with the carbide feed motor of an acetylene generator for the reasons above given, it may be used for almost any kind of spring-driven or weight-actuated motor, and particularly in relations where change in the motor speed is responsible for causing a certain condition to depart from normal and where it is desirable that the return of the condition to normal by slowing down or speeding up the motor be very rapid when the departure of the condition from normal is great and less rapid when such departure is not so great. So far as this and certain other aspects of the invention are concerned the change in the amount of submergence of the rotor in the liquid may be effected in any suitable way, but in the preferred form of the governor a bellows or equivalent device expansible by gas pressure is utilized for this purpose.

I claim:

1. In a gas producing system having a motor and means actuated by the motor whereby gas at a substantially predetermined pressure is produced when the motor is operated at a given speed, the improvement which comprises a governor for the motor having a casing, a rotor in the casing operatively connected to the motor, a liquid in the casing in contact with which the rotor is adapted to rotate to produce a braking effect on the motor, pressure responsive means adapted to cause more or less submergence of the rotor in the liquid to thereby increase or decrease the braking effect of the rotor on the motor, and means whereby the gas pressure created by operation of the motor operates said pressure responsive means, said rotor being adapted to produce a progressively greater braking effect on the motor as its submergence in the liquid increases to thereby reduce the pressure of the gas acting on said pressure responsive means.

2. In a gas producing system having a motor and means actuated by the motor whereby gas at a predetermined pressure is produced when the motor is operated at a given speed, the improvement which comprises a governor for the motor having a casing, a rotor in the casing operatively connected to the motor, a liquid in the casing in contact with which the rotor is adapted to rotate to produce a braking effect on the motor, pressure responsive means in said casing submerged in said liquid, and means whereby the gas pressure created by operation of the motor operates said pressure responsive means to expand the same and thereby raise the level of the liquid in the casing, said rotor being adapted to produce a progressively greater braking effect on the motor as the level of the liquid rises to thereby reduce the pressure of the gas acting on said pressure responsive means.

3. The improvement as set forth in claim 1 in which the rotor is adapted to so increase the braking effect on the motor as its submergence in the liquid increases that the amount of increase in such braking effect per given increment of increase in submergence becomes progressively greater as the submergence increases.

4. A motor governor comprising a casing, a rotor in the casing operatively connected to the motor to be governed, a liquid in the casing in contact with which the rotor is adapted to rotate to produce a braking effect on the motor, and means responsive to the speed of the motor and operating independently of the rotation of the rotor for causing more or less submergence of the rotor in said liquid to thereby increase or decrease the braking effect of the rotor on the motor.

5. A motor governor comprising a casing, a rotor in the casing adapted to be operatively connected with the motor to be governed, a liquid in the casing in contact with which the rotor is adapted to rotate to produce a braking effect on the motor, a pressure-responsive expansible member submerged in the liquid in the casing, means adapted to place said expansible member in communication with a source of gas under pressure whereby expansion of such member by the gas pressure raises the level of the liquid in the casing to submerge the rotor to a greater degree, said rotor being adapted to produce a progressively greater braking effect on the motor as the liquid level in the casing rises, and an element on the expansible member adapted to engage a part moving with the rotor after the expansible member has been expanded a predetermined amount by the gas pressure to thereby positively arrest rotation of said rotor.

6. A motor governor comprising a casing, a horizontal partition dividing the casing into upper and lower compartments, the partition being provided with openings placing the upper and lower compartments in communication, a rotor in the upper compartment of the casing adapted to be operatively connected with the motor to be governed, a liquid in the casing in contact with which the rotor is adapted to rotate to produce a braking effect on the motor, an expansible member in the lower compartment of the casing, means for placing said expansible member in communication with a source of gas under pressure whereby expansion of said member raises the level of the liquid in the casing, said rotor being adapted to produce a progressively greater braking effect on the motor as the liquid level in the casing rises, an arm connected to the rotor and adapted to rotate in a substantial horizontal plane near the top of the lower compartment, and an element at the upper end of said expansible member adapted to come into the path of movement of said arm after said expansible member has been expanded a predetermined amount by the gas pressure to thereby positively arrest rotation of the rotor.

GEORGE M. DEMING.

REFERENCES CITED

The following references are of record in the file of this patent:

UNITED STATES PATENTS

| Number | Name | Date |
| --- | --- | --- |
| 1,453,119 | Barr et al. | Apr. 24, 1923 |
| 2,182,076 | Elmer | Dec. 5, 1939 |
| 2,085,084 | Deming | June 29, 1937 |
| 980,918 | Brousseau | Jan. 10, 1911 |
| 815,390 | Vaughn | Mar. 20, 1906 |

FOREIGN PATENTS

| Number | Country | Date |
| --- | --- | --- |
| 22,494 | Great Britain | 1906 |